US006577926B1

(12) United States Patent
Chang et al.

(10) Patent No.: US 6,577,926 B1
(45) Date of Patent: Jun. 10, 2003

(54) METHOD OF DETECTING AND CONTROLLING IN-SITU FAULTS IN RAPID THERMAL PROCESSING SYSTEMS

(75) Inventors: Shih Hui Chang, Taipei (TW); Kuo-Hsien Cheng, Hsin Chu (TW); Cheng Kun Lin, Taipei-Hsien (TW); Wen Zen Chiu, Feng Yuan (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 0 days.

(21) Appl. No.: 09/280,508

(22) Filed: Mar. 30, 1999

(51) Int. Cl.[7] .............................................. G05B 21/00
(52) U.S. Cl. ...................... 700/274; 219/638; 219/490; 219/502; 165/96; 438/11; 438/795; 505/310
(58) Field of Search .................................. 219/638, 490, 219/502; 165/96; 438/11, 795; 505/310; 700/274

(56) References Cited

U.S. PATENT DOCUMENTS

| 3,980,854 | A | * | 9/1976 | Berkman et al. ........... 117/108 |
| 4,820,906 | A | * | 4/1989 | Stultz ........................ 219/405 |
| 4,891,335 | A | * | 1/1990 | McNeilly ..................... 117/88 |
| 5,377,197 | A | * | 12/1994 | Patel et al. ................. 714/724 |
| 5,517,594 | A | * | 5/1996 | Shah et al. ................ 118/50.1 |
| 5,624,590 | A | * | 4/1997 | Fiory .......................... 219/390 |
| 5,811,762 | A | * | 9/1998 | Tseng ......................... 118/728 |
| 5,847,366 | A | * | 12/1998 | Grunfeld .................... 165/80.4 |
| 5,848,842 | A | * | 12/1998 | Peuse et al. ..................... 374/1 |
| 5,859,964 | A | * | 1/1999 | Wang et al. .................. 714/48 |
| 6,268,270 | B1 | * | 7/2001 | Scheid et al. ................. 432/93 |
| 2001/0003336 | A1 | * | 6/2001 | Abbott et al. ............... 219/543 |

FOREIGN PATENT DOCUMENTS

| JP | 406162136 A | * | 6/1994 | ........... G06F/15/60 |
| TW | 387116 A | * | 12/1998 | ........ H01L/21/324 |

OTHER PUBLICATIONS

Harris, D. Quantitative Chemical Analysis, 4th Ed., W. H. Freeman and Company, NY (1995) Chapters 4, 6–2, 6–5, 6–6.*

* cited by examiner

Primary Examiner—Jill Warden
Assistant Examiner—Jennine Brown
(74) Attorney, Agent, or Firm—Tung & Associates (57) ABSTRACT

Faults occurring in the operation of a rapid thermal process system are detected and dynamically controlled in-situ. A data set is generated which represents the power applied to heating elements which are spatially arranged in a plurality of zones. The data is converted to a sequence of fractions respectively representing the power applied to each zone relative to the total applied power. The fractions are sequentially arranged and a least squares straight line fit for the fractions is calculated. The slope of the calculated straight line fit is used in a statistical process control system to determine whether a fault has occurred, and to make appropriate corrections in process control parameters, such as the length of time the process is carried out.

14 Claims, 6 Drawing Sheets

Zone Control Groups

|   | 150 mm | | 200 mm | |
|---|---|---|---|---|
| # | Lamps | Probe | Lamps | Probe |
| 1 | 1-2 | P1 | 1-2 | P1 |
| 2 | 3 | P2 | 3 | P2 |
| 3 | 4 | P3 | 4 | P3 |
| 4 | 5-6 | P4 | 5-6 | P4 |
| 5 | 7-12 | P6 | 7-8 | P6 |
| 6 | - | - | 9-12 | P7 |

| Raw data of fiber faults recorded from LogSheet | | | | | | |
|---|---|---|---|---|---|---|
| | Fiber 1 | Fiber 2 | Fiber 3 | Fiber 4 | Fiber 6 | Fiber 7 | Remark |
| DSRT01 | 2 | 4 | 1 | 1 | 5 | 38 | 1996/12/14 to 1998/03/31 |
| DSRT03 | | | 1 | 11 | 3 | 25 | 1997/07/12 to 1998/04/06 |
| DSRT05 | | | | 11 | | 5 | 1997/09/23 to 1998/04/02 |
| DSRT07 | | | | | 1 | | 1997/02/17 500W replaced |

METHOD OF DETECTING AND CONTROLLING IN-SITU FAULTS IN RAPID THERMAL PROCESSING SYSTEMS

FIELD OF THE INVENTION

The present invention broadly relates to rapid thermal processing systems, especially of the type employed in semiconductor manufacturing operations, and deals more particularly with a method of detecting and controlling in-situ faults related to failure of the system to operate within specified temperature limits.

BACKGROUND OF THE INVENTION

Rapid thermal processing (RTP) systems are used in semiconductor manufacturing operations to carry out several different processes, including rapid thermal oxidation and rapid thermal annealing. RTP systems have several advantages over conventional furnace systems. For example, one limitation of furnace systems employed to carry out oxidation processes is its inertia to temperature transition, resulting in a higher thermal budget. The thermal budget can be reduced considerably by increasing the duration of these transitions through the use of RTP. In the case of annealing processes wherein annealing removes defects introduced by ion implantation, the use of RTP systems provides a higher level of dopant activation and annealing effect, compared to conventional furnace systems.

In an RTP system, a semiconductor wafer is rapidly heated from a low temperature to a high processing temperature. It is held at this elevated temperature for a short time and then brought back rapidly to a low temperature. Typical temperature transition rates range from 10°/sec to 350°/sec, compared to about 0.1°/sec for furnace processing. RTP durations at high processing temperatures vary from one second to five minutes.

In order to control process parameters and particularly temperature, a temperature sensing device, such as an optical pyrometer is used to measure the temperature on the backside of the wafer, typically at a wave length, for example, of 0.95 $\mu$m.

RTP processing is important where precise thermal control and short high temperature process times are critical. When used to grow thin oxide films, the process is referred to as rapid thermal oxidation (RTO). Oxide layers with film thicknesses from 0.004 $\mu$m to 0.4 $\mu$m can be grown in pure oxygen at 900° C. to 1150° C. for a duration of only 15 to 180 seconds. In addition, the electrical characteristics of rapid thermal oxides have been found to be equivalent to or better than furnace-grown thermal oxides. RTO grown films on polycrystalline silicon exhibit electrical breakdown fields that approach those of oxides grown on single-silicon. RTP is also used to grow other insulating films, to activate implanted ions and form shallow junctions, to alloy contacts and form conducting fields, such as titanium-silicide and titanium-nitrides, and to reflow glass.

Rapid thermal annealing allows the removal of defects introduced by ion implantation, and activation of species with little movement of the diopants. While conventional furnaces are capable of supplying high temperature, the slow insertion and removal of the wafers and the heat capacity of the system require ramp up and ramp down times in the range of minutes, thus resulting in excessive movement of dopants. In contrast, during rapid thermal annealing, the entire wafer is heated uniformly in seconds and, after annealing, the wafer is cooled in seconds.

Typical RTP systems are integrated into semiconductor processing stations, such as CVD or PVD chambers where heating is provided by a multiplicity of heating elements, typically thermal generating lamps, spatially arranged into a plurality of heating zones. The heating elements are normally arranged so as to face both the front side and backside of the wafer. One or more temperature sensing devices, such as pyrometers or emissometers, are strategically placed so as to sense the temperature at one or more locations within the chamber. The temperature sensors are typically connected by optical fibers to a temperature recording system which records the temperature at multiple locations in the chamber throughout each processing cycle in which one or more wafers are processed.

Precise temperature control in RTP systems over the entire processing cycle may be critical to achieving acceptable processing results. This means that the temperature at each monitored location in the chamber must be maintained within certain limits during both temperature ramp up and ramp down sequences. When the temperature at one or more monitored locations is not maintained within desired limits, a "fault" occurs which may have a material effect on quality of process, and thus on the quality of the wafer.

In the past, it was not always possible to detect a fault during an RTP cycle. Consequently, the out-of-limit condition was not be detected, and appropriate steps could not be taken to correct the condition, until after one or more batches of wafers had been processed. Accordingly, the inability to detect and dynamically correct a temperature fault condition during an RTP cycle resulted in scrap rates, and therefore, reduced yields.

The task of accurately monitoring the temperature at multiple locations in the processing chamber is complicated by several factors. First, the emissivity of heat radiation from the wafer is significantly affected by the nature of the surface on the wafer backside. For example d-poly film grown by HTF on the wafer backside can form Newtonian ring-like concentric circles which have a constructive or destructive effect on the radiation waves impinging the wafer surface, thereby increasing or decreasing the magnitude of measured radiation. Second, inaccurate radiation measurements sometimes occur as a result of the presence of small broken fragments and residues of wafers remaining in the processing chamber from processing previous batches of wafers. The presence of these residual wafer fragments in the chamber alters emissivity measurements, thus giving rise to inaccurate readings which may prevent the detection of temperature control faults, and the initiation of dynamic controls needed to bring temperature parameters within proper limits.

Yet another factor affecting temperature control relates to degradation of certain components of the RTP system. Emissometers, optical fibers and pyrometers functionally decay in performance over their service lives, thus affecting their performance and accuracy. The decay in performance of these components is not easily detected, further complicating the task of detecting temperature faults and dynamically correcting control parameters.

Accordingly, there is a clear need in the art for a method of detecting in-situ, temperature control faults, and dynamically correcting temperature control parameters in RTP systems of the type described above.

SUMMARY OF THE INVENTION

According to one aspect of the present invention, a method is provided for detecting and controlling in-situ faults occurring in a rapid thermal processing system. The method comprises the steps of: (A) generating a set of data relating to the distribution of power applied to the heating elements in the zones; (B) converting the data in the data set into a data format representing the current collective state of the power distribution for all of the zones; (C) comparing the converted data set with a set of statistical data representing a standard: and, (D) changing at least one process control parameter affecting the thermal process based on the comparison.

The data conversion is preferably performed by determining the total power applied to all the lamps in all of the zones and producing a plurality of fractions by dividing the numerical values of the power applied to the lamps in each of the zones by the total power. The fractions are then arranged in sequence from smallest to largest numerical value following which a calculation is made of the slope of the sequentialized fractional values. The slope is preferably calculated by the least squares straight-line method. The data conversion step preferably includes weighting at least certain of the fractions based on data obtained from a statistical process control system. The method further includes the step of storing the set of statistical data in a program computer and inputting of the slope to the computer, wherein the program computer compares the slope to a stored set of statistical data.

According to another aspect of the invention, a method is provided for detecting and controlling a rapid thermal process system of the type employing a multiplicity of heating elements spatially arranged in a plurality of zones, comprising the following steps: (A) determining the power applied to the heating elements in each of the zones; (B) determining the total power applied to all of the heating elements in all of the zones; (C) forming a plurality of fractions respectively associated with the plurality of zones, wherein the numerator of each of the fractions represents the power applied to the associated zone, and the denominator represents the power applied to the heating element in all of the zones; (D) arranging the fractions in a desired sequence; (E) determining the slope of a line representing the values of the sequentially arranged fractions; (F) comparing the slope with a reference slope; and; (G) changing at least one parameter for controlling the process based on the comparison.

Accordingly, it is a primary object of the present invention to provide a novel method for detecting and controlling in-situ temperature control faults occurring in a rapid thermal process system.

Another object of the invention is to provide a method of the type described above in which power delivered to a multiplicity of heating elements spatially arranged in a plurality of zones is dynamically controlled based on information derived from a statistical process control system.

A further object of the invention is to provide a method of the type previously mentioned which is not affected by decay in component performance or variations in emissivity related to wafer surface characteristics or material residue within the processing chamber.

A still further object of the invention is to provide a method as described above which can be implemented largely through software and the use of a statistical process control system.

These, and further objects and advantages of the present invention will be made clear or will become apparent during the course of the following description of a preferred embodiment of the invention.

BRIEF DESCRIPTION OF THE DRAWINGS

In the drawings, which form an integral part of the specification and the appended claims, and which are to be read in conjunction therewith, and wherein like reference numbers are employed to designate identical components in the various views:

DETAILED DESCRIPTION OF THE PREFERRED EMBODIMENTS

Figure 1:
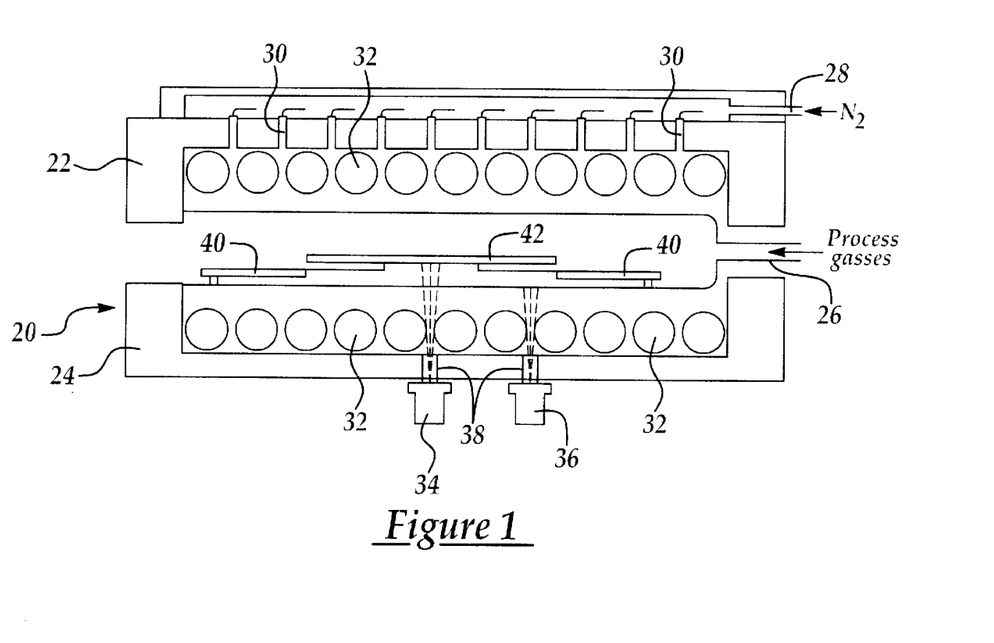
FIG. 1 is a diagrammatic, cross sectional view of a semiconductor processing chamber having a rapid thermal process system therein, and of the type employed to carry out the method forming the preferred embodiment of the present invention.

Referring now to the accompanying drawings, the present invention involves a novel method of detecting in-situ and dynamically controlling faults occurring in a rapid thermal processing system (RTP), which will be described below. The RTP system is typically used in processing apparatus, for example a PVD (Physical Vapor Deposition) or CVD (Chemical Vapor Deposition) apparatus 20, as shown in FIG. 1. The apparatus 20 is employed to perform any one of various process steps used in manufacturing semiconductor devices, such as the semiconductor wafer 42. The apparatus 20 broadly includes a process chamber 26 which may comprise, for example a quartz tube within which chemical or physical deposition processes are carried out. The wafer 42 is supported on a circular supporting ring 40 mounted within the chamber 26. The chamber 26 includes the suitable opening 27 through which process gasses may enter or depart. The lower half of the chamber 26 is enclosed by a water cooled outer jacket 24, while the upper half of the chamber 27 is enclosed by a cooling jacket 22 having an inlet 28 for receiving an inert, cooling gas such as nitrogen. The upper jacket 22 includes a plurality of opening 30 which allow the cooling gas to pass into an area 29 which surrounds the outer wall of the chamber 26.

Figure 2:
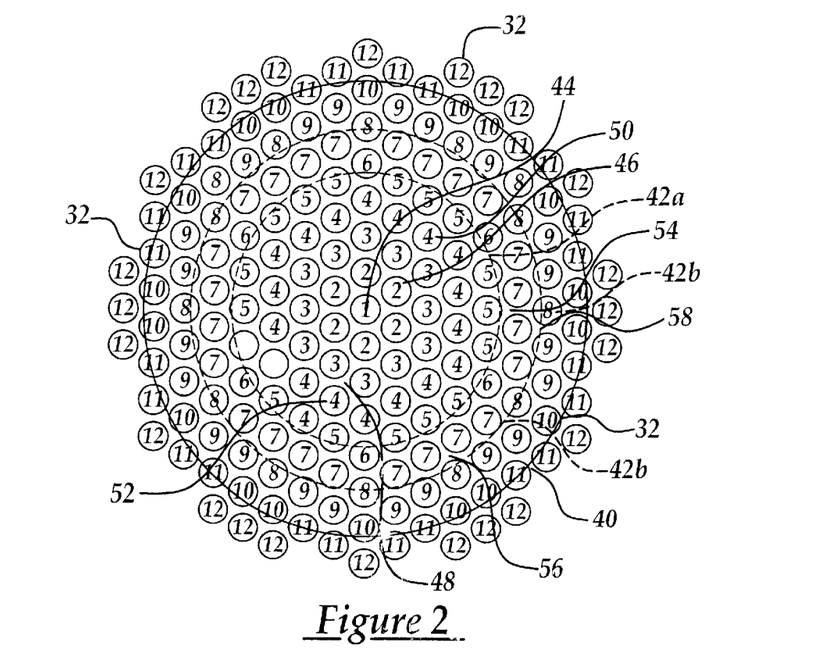
FIG. 2 is a diagrammatic, plan view showing the locations of the heating elements and zones thereof employed in the RTP system of FIG. 1.

Within the chamber 26, there is provided upper and lower sets of heating elements in the form of individual heat lamps 32. As seen in FIG. 2, the lamps 32 are arranged in twelve generally ring shaped zones radiating outwardly from a central point which is vertically aligned with the center of the wafer 42. The outer zone of lamps, indicated by the numeral 12, extend approximately just radially beyond the outer periphery of the ring shaped support 40. The position of a 150 mm wafer (six inch) is indicated by the phantom line 42a, while the position of a 200 mm (eight inch) wafer is indicated in the phantom and designated by the number 42b.

The temperature within the chamber 26 is sensed by means of a plurality of radially and circumferentially spaced temperature probes, P1–P7, which are respectively designated by the numerals 44–56 in FIG. 2. The temperature probes 44–56 may comprise for example, conventional pyrometers, two of which are shown in FIG. 1 and designated by the numerals 34–36. The pyrometers 34–36 are mounted on the exterior face of the lower enclosure portion 24, and are aligned with openings 38 in the enclosure which are respectively positioned to allow radiation emanating from the interior of the chamber 26 and the backside of the wafer 42 to pass between the lamps 32 and reach the pyrometers 34–36. The pyrometers 34–36 are in turn coupled typically by electrical connections or optical fibers (not shown) to a conventional processing system for measuring the magnitude of the received thermal radiation.

Figure 3:
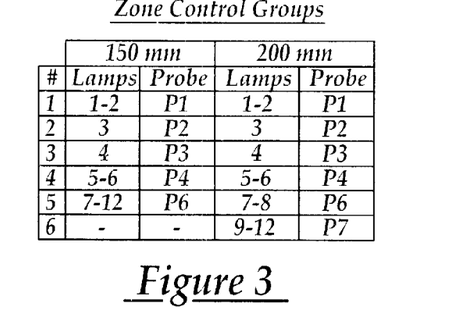
FIG. 3 is a table showing the relationship between the heating element zones and the temperature probes for two sizes of semiconductor wafers.

FIG. 3 is a table showing the relationships of the temperature probes P1–P7 to the zoned grouping of lamps for both 150 mm and 200 mm wafers. For example, in the case of a 200 mm wafer temperature, probe P1 senses the reflected radiation primarily generated by the lamps in zones 1 and 2, temperature probe P3 senses the reflected radiation primarily generated by the lamps in zones 4 and temperature probe P7 senses the reflected zonal radiation generated by the lamps in zones 9–12.

Figure 4:
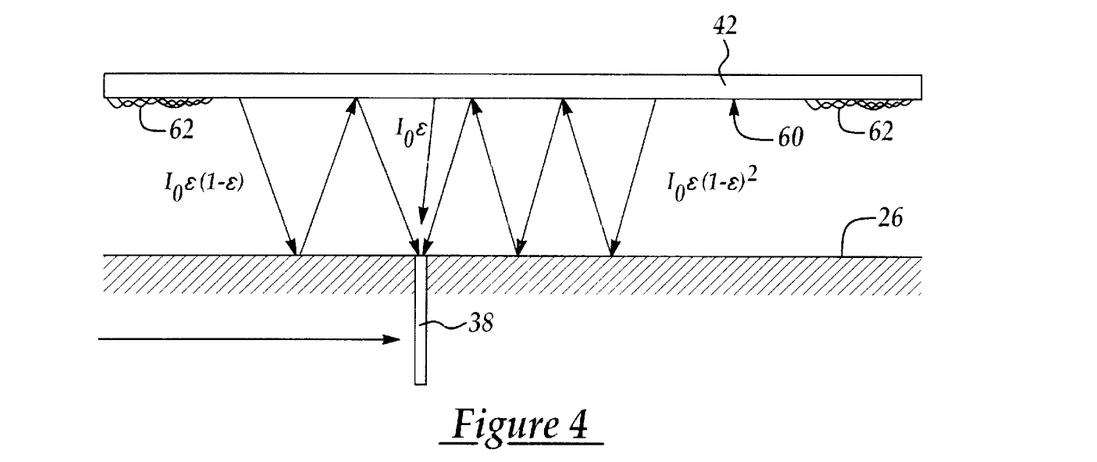
FIG. 4 is an enlarged, cross sectional view of a portion of the chamber shown in FIG. 1, depicting the interaction of thermal radiation between one side of the wafer and a chamber wall.
Figure 13:
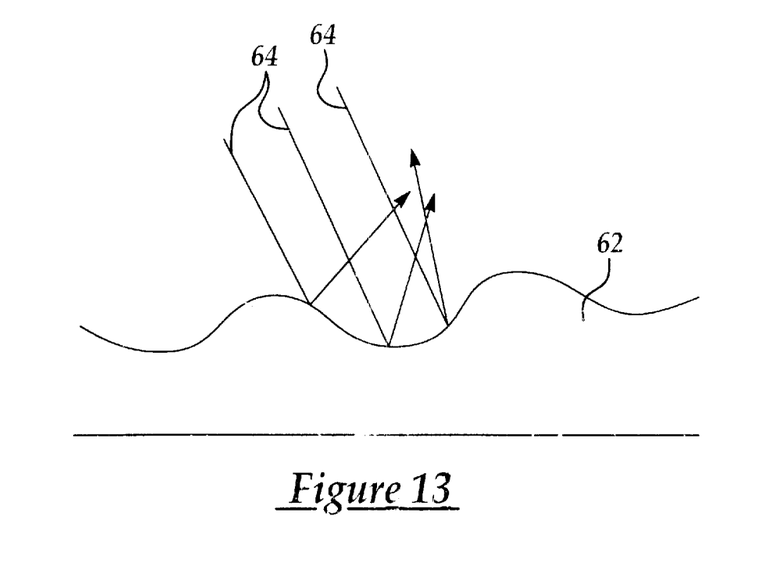
FIG. 13 is a diagrammatic view depicting the constructive and destructive effects of radiation waves reflected from reflectors forming part of the chamber shown in FIG. 1 specifically from wafers containing Newtonian ring-like concentric circles on the backside; and, FIG. 14 is a logical flow chart of the method forming the preferred embodiment, and the associated software for implementing the method.

Turning attention now also to FIG. 4, heat generated by the previously described lamps 32 pass upwardly through the wall of the chamber 26 resulting in thermal radiation which then passes through the process gasses in chamber 26 to impinge on the backside of the wafer 42. Depending on the stage of processing of the wafer 42, certain films, such as d-polyfilm grown by HTF present a surface roughness indicated by the numeral 62 on the backside surface 60 of the wafer 42 which may significantly affect the emissivity from the wafer backside. This film surface geometry or roughness 62 is better seen in FIG. 13. The surface geometry 62 essentially takes the form of Newtonian ring like concentric circles that have either a constructive or destructive effect on the radiation waves 64 that are reflected from the chamber surface 61 and impinge upon the backside surface 60 of the wafer 42. As a result of this constructive or destructive effect the magnitude of the radiated thermal energy measured by a related temperature probe P1–P7 is either increased or decreased accordingly.

Referring particularly to FIG. 4, a modified temperature probe is depicted which comprises a fiber optic probe 39 that passes through the water cooled reflecting surface 61 of the chamber 26 and thus collects thermal radiation consisting of directly collected radiation, i.e. that directly reflected from the backside 60, as well as reflected or enhanced radiation, i.e. radiation that has been reflected between the backside 60 and the reflecting surface 61. The enhanced radiation sensed by probe 39 is given by the formula:

Enhanced Radiation=$I_0\epsilon + I_0\epsilon(1-\epsilon) + I_0\epsilon(1-\epsilon)^2 + I_0\epsilon(1-\epsilon)^3 + \ldots$ The collected radiation sensed by the probe 39 is given by the following formula:

$$\text{Collected Radiation} = \varepsilon I_o \sum_{n=0} (1-\varepsilon)^n = \frac{\varepsilon I_o}{1-(1-\varepsilon)} = I_o$$

Figure 6:
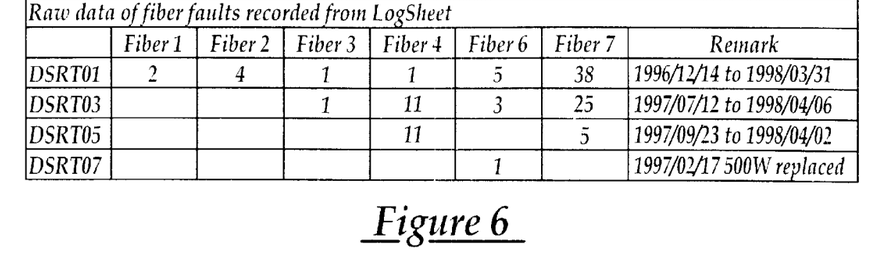
FIG. 6 is a table of actual data depicting the faults recorded in an RTP system without use of the method of the present invention.

FIG. 6 is a table of data showing the faults recorded by certain of the probes P1–P7 (but designated by fibers 1,2,3, etc.) over its four different durations of time, the first duration being Dec. 14, 1996 to Mar. 31, 1998. The faults recorded in the table shown in FIG. 6 occurred in a system that did not use of the novel method of the present invention, and show the significance of the problems solved by the present invention. In each case where a fault occurred, either the temperature within a particular zone failed to fall within a prespecified limits, or some component of the temperature sensing system, e.g. pyrometer, optical fiber, etc. failed to operate properly. The result of such faults is that one or more batches of semiconductor wafers were scrapped.

Figure 7:
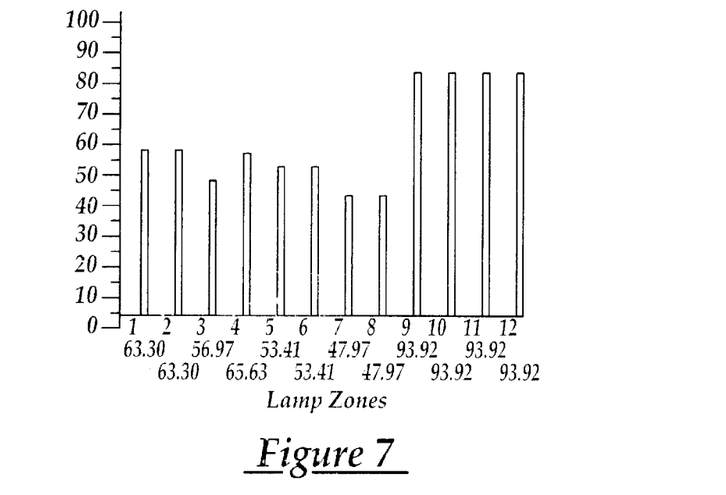
FIG. 7 is a graph of actual data showing the power applied to each of the heating element zones using the method of the present invention.

FIG. 7 is a replication of a display screen used by an equipment operator to monitor the dynamic temperature control system forming part of the method of the present invention. The screen shown in FIG. 7 depicts a graph in which the ordinate represents the percentage of electrical power applied to the lamps 32 in one of the 12 zones (as a percentage of full power), while the abscissa is arranged in bars representing lamps in each of the 12 zones. The exact percentage of power applied in each of the zones is also shown along the abscissa.

Figure 8:
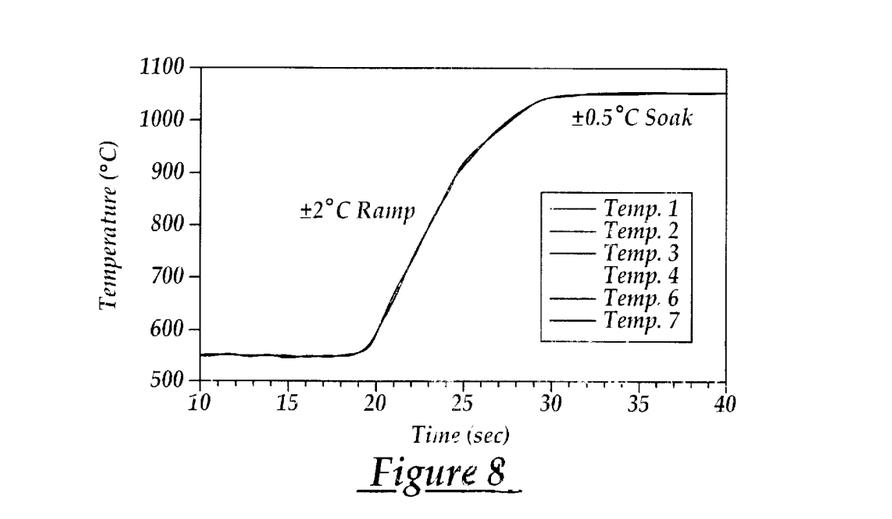
FIG. 8 is a graph of actual data showing the performance of an RTP system using the method of the present invention.

FIG. 8 is a graph showing the temperature recorded over a period of time, as recorded by each of the seven temperature probes. The graph was generated using the information from actual logged data for 200 mm wafers processed with boron implant annealing. This graph demonstrates the tight temperature control that can be achieved by using the method of the present invention.

Figure 9:
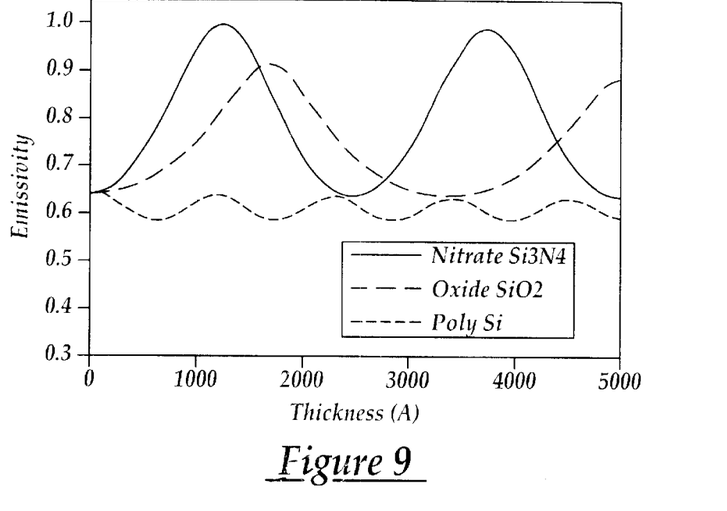
FIG. 9 is a graph showing the emissivity as a function of thickness of three different layers of film applied to the backside of a wafer.

FIG. 9 is a graph showing the emissivity as a function of thickness of silicon coated with single layer films Si3 N4, Si O2 and poly-Si, all taken at 1000° C. and λ=0.93 μm. This graph demonstrates the relatively wide variation in emissivity of various types of films which heretofore made control of the temperature during RTP very difficult. However, the variability introduced by such parameters are compensated for through the use of in-situ fault detection and dynamic temperature control afforded by the method of the present invention.

Figure 10:
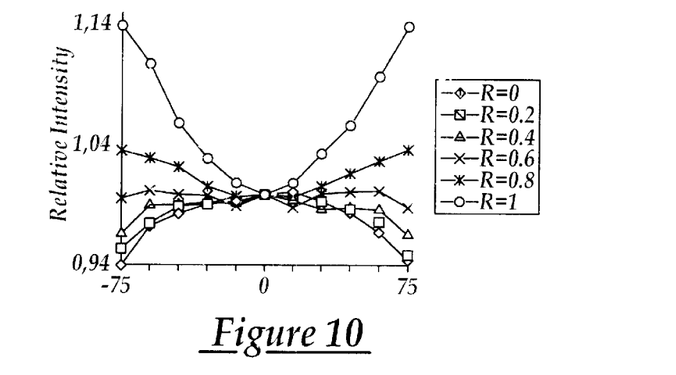
FIG. 10 is a graph showing the intensity profiles for different chamber reflectivities, and depicting the relative intensity of emissivity as a function of radial positioning along a line passing through the center of the wafer.

FIG. 10 is a graph showing the relative intensity of radiation reflection, as a function of a radial position from the center of the chamber for a plurality of chamber reflectivities. Such information is helpful in formulating weighting factors which are applied to temperature data that is recorded and processed in accordance with the method of the present invention, as will be discussed below.

Figure 11:
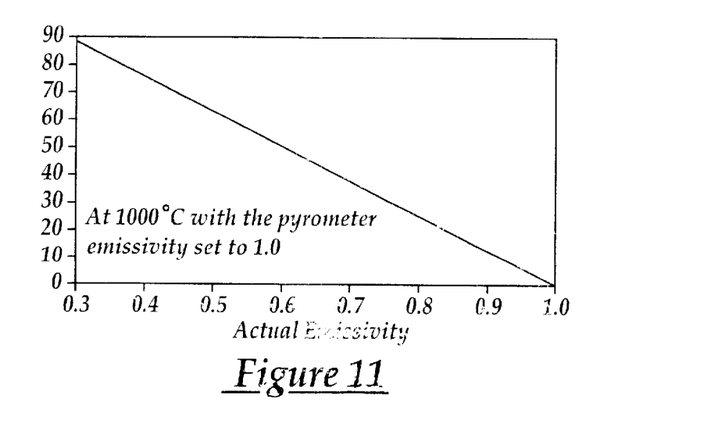
FIG. 11 is a graph showing temperature measurement error using a standard pyrometer.

FIG. 11 is a graph showing temperature measurement error using standard pyrometry, without the benefit of the method of the present invention. The graph shown in FIG. 11 is a plot of the measurement error as a function of actual emissivity of the wafer backside.

Figure 12:
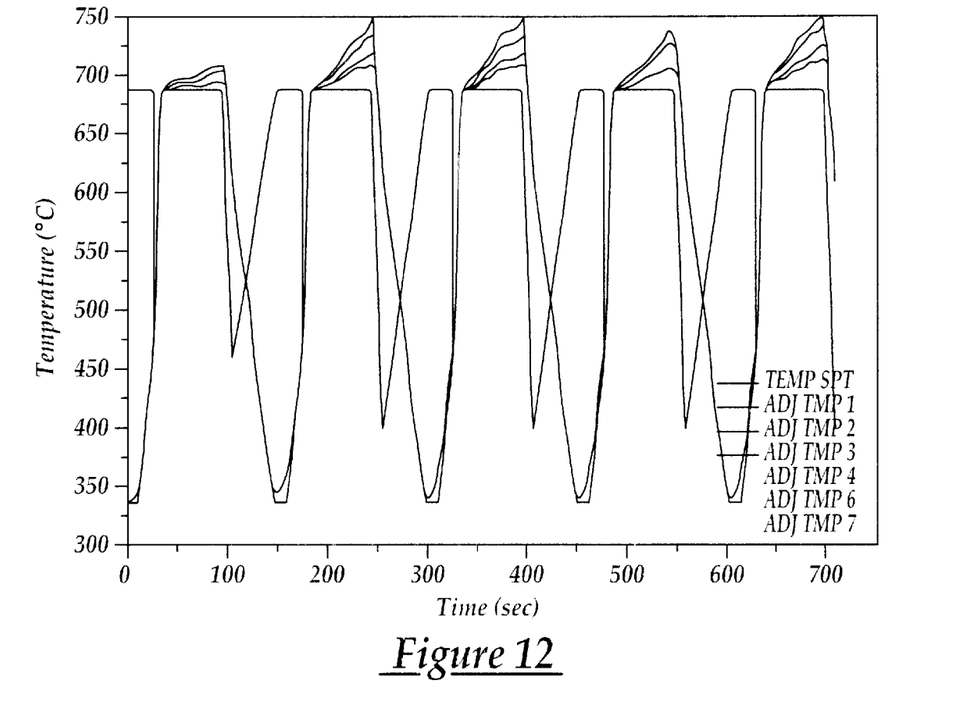
FIG. 12 is a graph of actual data showing the temperature as a function of time as measured by temperature probes located within the various heating element zones.

FIG. 12 is an actual plot of the temperature recorded by the probes P1–P7 as a function of time which is used for dynamic temperature control in accordance with the method of the present invention.

As previously mentioned, the lamps 32 are spatially arranged in a plurality of zones. The lamps 32 in each of these zones derives power from an electrical power source which is operated by a controller so that the power applied to the lamps in each zone may be separately controlled. The lamp zones are controlled by a closed loop power matrix, which includes feedback of the actual power level so that the total power applied to each zone is precisely controlled. Typically, the actual lamp power delivered to each zone may be sampled 20 times per second.

Figure 5:
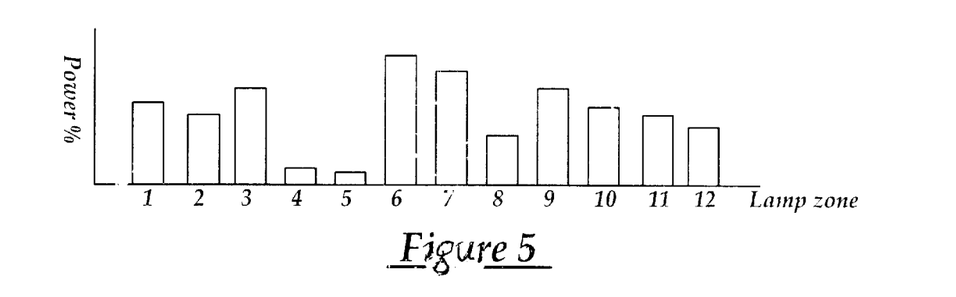
FIG. 5 is a graph showing the distribution of power applied to the heating elements in each of the zones.

FIGS. 5 and 7 depict the instantaneous power applied to the lamps in each of the 12 zones, as a percentage of maximum or full power, and it can be readily seen that a different level of power is applied to the lamps in each of the lamps in the 12 zones. The power level supplied to each zone is determined by the temperature sensed by each of the probes P1–P8, as well as by other data forming part of an SPC (Statistical Process Control) system. The details of the SPC system will depend upon the particular application, process and equipment, and need not be disclosed here since such systems are well known in the art. Generally however, SPC involves the use of quality control charts which are based on data generated through inspections conducted on in-process goods during production to identify any changes in quality and help assign a cause to that change. The inspections are conducted only on random samples from each "batch" of the goods manufactured, without inspecting every item. This is based on the assumption that if the selected test pieces meet the quality standards, then all the other items which came from the same batch of production should also satisfy the requirements. SPC therefore relies on the idea that decisions can be made on the quality of a batch of products from a given production process without inspecting every item.

In any event, the power control matrix, i.e. the power applied to the lamps in each of the zones, is dynamically controlled in accordance with the present method based on emissivity results if the temperature within the chamber 26 is out of prescribed limits. As previously discussed, the temperature may be out of limits as the result of particular wafer backside films, tiny broken wafer articles or residue within the chamber and functional decay of system components to include optical fibers, pyrometers and emissiometers.

As will be discussed below in more detail, the method comprises in part identifying and defining the temperature fault and then calculating the power signal variation data using a fractional and centroid method. The average power signal variation data is then weighted by any of a number of data related to quality and productivity. The fractions of power data by lamp zones are then arranged in a sequence following which their linearity or slope is determined using a least squares straight line method. Once this slope is determined, it is compared with reference data or a reference slope forming part of an SPC system, and appropriate changes are made in the power level applied to each zone.

Figure 14:
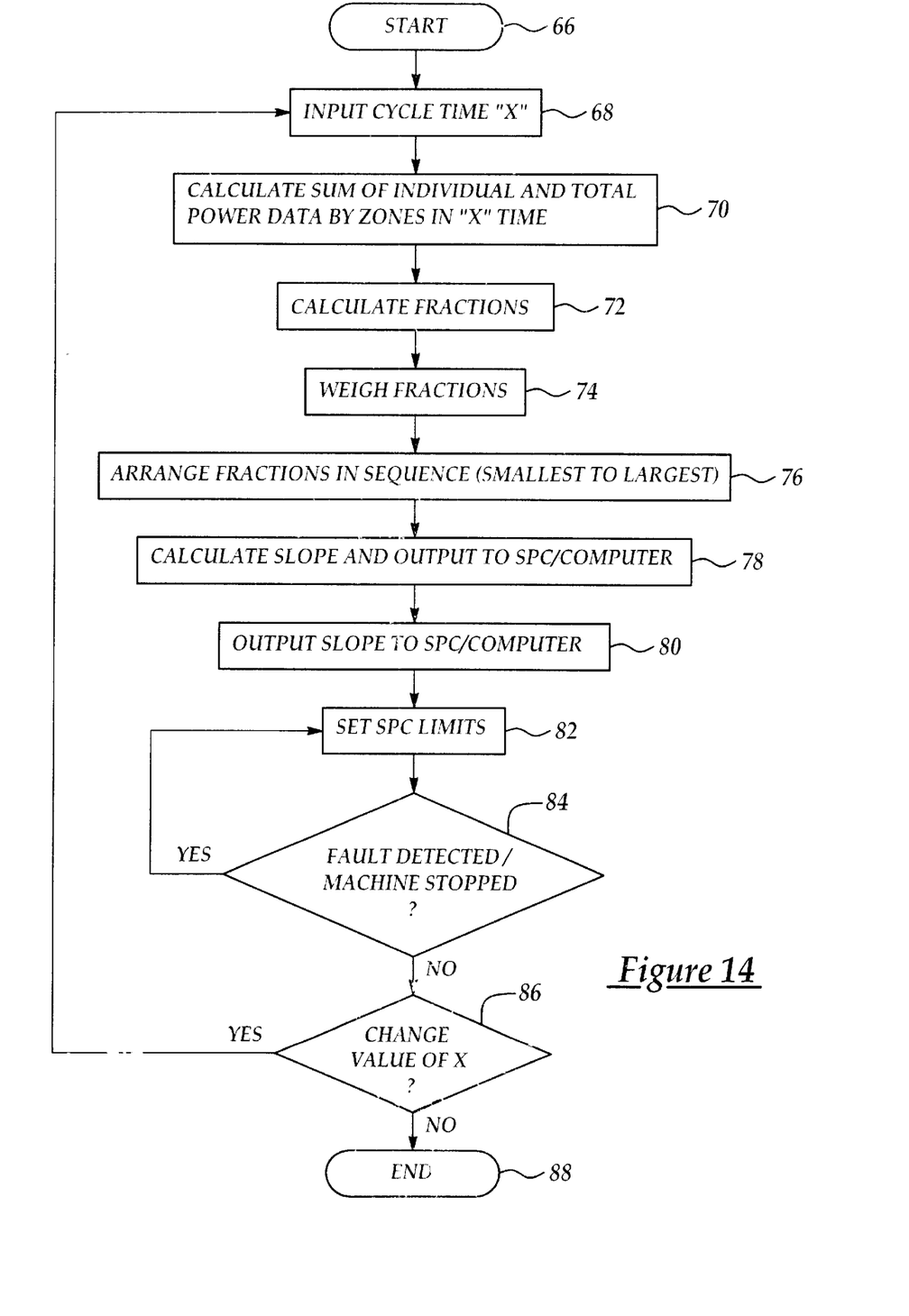

The method may be more particularly described with reference to FIG. 14 which depicts the steps of the method in more detail and conveniently forms a flow chart of the related software which may be employed to automatically implement the novel method. The process is started at 66, whereupon the input cycle time "x" is chosen and input to an appropriate control system. "x" is normally the time period during which the RTP process is to be carried out according to a particular process recipe, and during which period data consisting of the power level applied to each of the lamp zones is constantly acquired. Also input at 68 is the lamp power data according to zones which is constantly updated at the rate of, for example, 20 times per second. At 70, the sum of the power levels in each zone and the total power applied to all the zones is calculated during the cycle time "x". The method then calculates a series of fractions, one for each of the 12 zones, wherein the numerator of the fraction represents the average instantaneous power applied to the associated lamp zones, and the denominator is the average total instantaneous power applied to all of the zones. The fractions having been formed for all 12 zones, they are then "weighted", typically using statistical information, such as that obtained from an SPC system. This statistical information is normally based on historical information related to the quality of wafers based on specific process recipes and process parameters.

The weighted fractions are then arranged in a predefined sequence typically smallest to largest, as shown at step 76. Then, at step 78, the slope of a line representing a "best fit" is calculated using the well known least squares technique for fitting a straight line to a set of distributed data which generally represent a linear trend. This calculated slope is then delivered, at 80, to a standard SPC system which may include a programmed computer for maintaining and calculating the statistical process control information as well as programmed instructions for controlling the power level matrix for the ramp zones. At step 82, limits are set in the SPC system related to process parameters, and representing a desired level of control. A check is then performed at 84 to determine whether a fault has been detected and the processing system has been stopped based on issuance of commands from the controller computer. This fault, as discussed earlier, would be related to the temperature sensed by one or more of the temperature probes P1–P8 being out of limits, based on range parameters provided by the SPC system. If a fault is detected, the information is used to reset the SPC level at 82. If a fault is not detected then the determination is made at 86 as to whether or not the cycle time value "x" should be changed. If the answer is yes, the new cycle time is input at 68, otherwise the process ends at step 88.

From the foregoing, it is apparent that the method of detecting and controlling in-situ faults occurring in a RTP system as described above not only provides for the reliable accomplishment of the objects of the invention, but does so in a particularly effective and economical manner. It is recognized of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of detecting and controlling in-situ faults occurring in a rapid thermal processing system of the type having a multiplicity of heating elements spatially arranged in a plurality of zones, comprising the steps of:

(A) generating a set of data related to the distribution of power applied to the heating elements in said zones;

(B) converting the said data set into a data format representing the current collective state of power distribution for all of the said zones;

(C) comparing the converted data set with a set of statistical data representing a reference standard; and (D) changing at least one process control parameter affecting the thermal process based on the comparison in step (C).

2. The method of claim 1, where step (B) is performed by:

determining the total power applied to all of the lamps in all of the zones, and processing a plurality of fractions by dividing the numerical values of the power applied to the lamps in each of the zones by total power.

3. The method of claim 2 wherein step (B) is further performed by sequentializing the values represented by said fractions by arranging said fractions in order from the smallest to the largest numerical value, and calculating the slope of the sequentialized fractional values.

4. The method of claim 3, wherein the slope is calculated by a least squares straight line method.

5. The method of claim 1, wherein said process control parameter is the length of time the rapid thermal process is carried out.

6. The method of claim 2, wherein step (B) is further performed by weighting at least certain of said fractions.

7. The method of claim 1, wherein step (D) includes periodically determining the changes in the level of power applied to the said heating elements in each of the zones.

8. The method of claim 3, including the steps of:

storing said set of statistical data in a programmed computer, and inputting said slope to said computer, and wherein said programmed computer compares said slope to said set of statistical data.

9. A method of detecting and controlling in-situ faults occurring in a rapid thermal process system of the type employing a multiplicity of heating elements spatially arranged in a plurality of zones, comprising the steps of:

(A) determining the power applied to the heating elements in each of the zones;

(B) determining the total power applied to all of the heating elements in all of said zones;

(C) forming a plurality of fractions respectively associated with said plurality of said zones, wherein the numerator of each of said fractions represents the power applied to the associated zone, and the denominator represents the power applied to the heating elements in all of the zones;

(D) arranging said fractions in a desired sequence;

(E) determining the slope of a line representing the values of the sequentially arranged fractions;

(F) comparing said slope with a reference slope; and (G) changing at least one parameter for controlling said process based on the comparison performed in Step (F).

10. The method of claim 9, wherein the sequence in step D is from the smallest value to the largest value.

11. The method of claim 9, wherein step (E) is performed by a least squares calculated method.

12. The method of claim 9, said reference slope is related to a set of historical statistics forming a part of a statistical process control system.

13. The method of claim 9, wherein said one parameter comprises the time period over while the process is carried out.

14. The method of claim 9, including the step of terminating the process when the comparison performed in step (F) indicates the occurrence of fault.

* * * * *